United States Patent
Bennett

(10) Patent No.: US 8,076,565 B1
(45) Date of Patent: Dec. 13, 2011

(54) MUSIC-RESPONSIVE ENTERTAINMENT ENVIRONMENT

(75) Inventor: Darren Bennett, Chicago, IL (US)

(73) Assignee: Electronic Arts, Inc., Redwood City, CA (US)

( * ) Notice: Subject to any disclaimer, the term of this patent is extended or adjusted under 35 U.S.C. 154(b) by 805 days.

(21) Appl. No.: 11/838,164

(22) Filed: Aug. 13, 2007

Related U.S. Application Data

(60) Provisional application No. 60/822,230, filed on Aug. 11, 2006.

(51) Int. Cl.
*A63H 5/00* (2006.01)
*G04B 13/00* (2006.01)
*G10H 7/00* (2006.01)

(52) U.S. Cl. ............................................... 84/609
(58) Field of Classification Search ............ 84/609
See application file for complete search history.

(56) References Cited

U.S. PATENT DOCUMENTS

| | | | |
|---|---|---|---|
| 6,822,153 B2 * | 11/2004 | Comair et al. | 84/609 |
| 7,105,736 B2 * | 9/2006 | Laakso | 84/615 |
| 7,355,112 B2 * | 4/2008 | Laakso | 84/615 |
| 2007/0006708 A1 * | 1/2007 | Laakso | 84/1 |
| 2007/0163427 A1 * | 7/2007 | Rigopulos et al. | 84/609 |
| 2007/0245881 A1 * | 10/2007 | Egozy et al. | 84/609 |
| 2009/0165632 A1 * | 7/2009 | Rigopulos et al. | 84/609 |

* cited by examiner

*Primary Examiner* — Jeffrey Donels

(57) ABSTRACT

An electronic entertainment system provides an entertainment environment wherein music in the form of a storable music sequence is processed to determine, in advance or in real-time, a set of musical events of interest, and associating elements of the entertainment system with portions of the storable music sequence, wherein an association is represented by a data structure and indicates a mapping between at least one musical event and at least one element of the entertainment environment, wherein the at least one element can be independent of the at least one musical event.

8 Claims, 5 Drawing Sheets

MUSIC-RESPONSIVE ENTERTAINMENT ENVIRONMENT

CROSS-REFERENCE TO RELATED APPLICATIONS

This application claims priority from co-pending U.S. Provisional Patent Application No. 60/822,230, filed Aug. 11, 2006 entitled "Music-Responsive Entertainment Environment" which is hereby incorporated by reference, as if set forth in full in this document, for all purposes.

FIELD OF THE INVENTION

The present invention relates to entertainment systems in general and in particular to interactive entertainment systems that include music and allow for user interaction with the entertainment systems and are responsive to the music.

BACKGROUND OF THE INVENTION

When a person plays a video game, he enters the virtual world of the game's environment. Video games often include sound effects that are appropriate to the game and which make the game seem more realistic, for example, engine revving sounds when a car accelerates in a driving game, or the sounds of a person reacting in response to being hit in a fighting game. Video games also often include background music to make the game player's experience more pleasurable.

BRIEF SUMMARY OF THE INVENTION

Embodiments of the present invention include an entertainment environment for implementation within an electronic entertainment system wherein music in the form of a storable music sequence is processed to determine, in advance or in real-time, a set of musical events of interest, and associating elements of the entertainment system with portions of the storable music sequence, wherein an association is represented by a data structure and indicates a mapping between at least one musical event and at least one element of the entertainment environment, wherein the at least one element can be independent of the at least one musical event.

Musical events include the music's beat, pitch, volume, type, etc. Interactive elements can be triggered by the musical events to function in a desired way. Other mechanisms can be triggered by the musical events and/or a combination of musical events and a user's actions to have an effect on other elements in the entertainment experience. Non-interactive elements can also be responsive to the musical cues and provide visual reference cues for the music.

A method for creating an entertainment environment includes selecting a musical event, associating the musical event with an environmental object, selecting a response to the musical event, and associating the response with the environmental object. The entertainment environment can be any piece of media, interactive software, trailer, video, or movie. In an example, the entertainment environment is a video game and the environmental elements are objects associated with the game. The elements can be interactive, non-interactive, or can be changed from interactive to non-interactive. An apparatus for creating an entertainment environment might include means for selecting a musical event, means for associating the musical event with an environmental element, and means for accessing the environmental element in accordance with the musical event.

The following detailed description together with the accompanying drawings will provide a better understanding of the nature and advantages of the present invention.

DETAILED DESCRIPTION OF THE INVENTION

Figure 1:
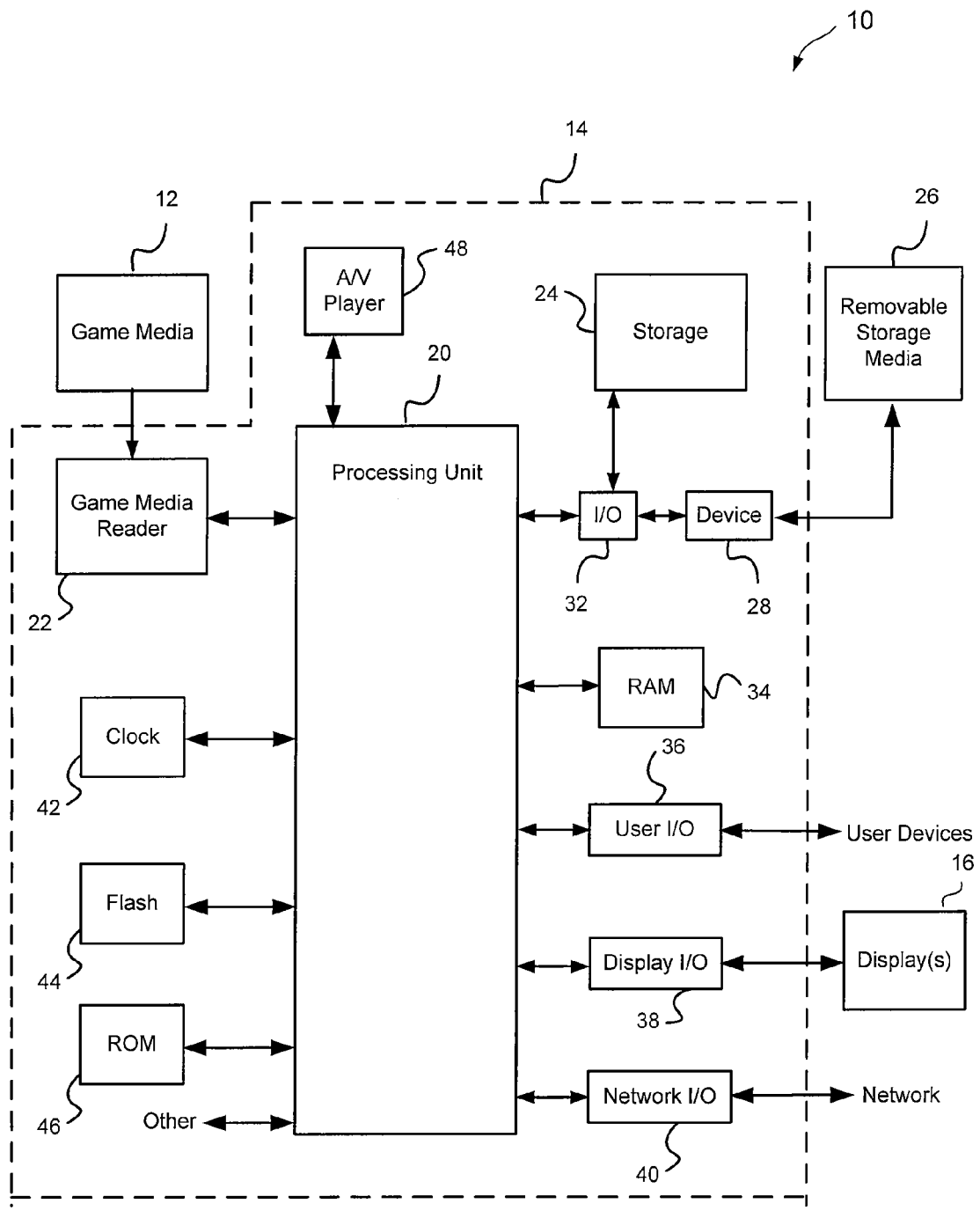
FIG. 1 is a block diagram of a game device in accordance with an embodiment of the present invention.

An improved entertainment system and environment is described herein, wherein the environment is responsive to music events in music that is played in the entertainment system. The entertainment system is an electronic, computer, and/or networked system that provides and/or generates an entertainment environment with which users of the entertainment system interact.

An example of an entertainment system and environment is a video game. A computer, computing device, game console, or the like might be the embodiment of the entertainment system that entertains by interacting with a user, accepting inputs from the user, manipulating an internal representation of a game space according to game rules and presenting the user with audio, video and possibly other outputs corresponding to output representations of the state of the video game. In a specific example, the internal representation is a 2D, 2.5D, or 3D virtual space, the user input is from user input devices and the display is a view into the virtual space while providing audio outputs from the game. The user interacts with the entertainment system by providing user inputs and with an interactive system, the outputs reflect the user's inputs and take them into account. While it might not be the case, in the examples here, the user is a person playing the video game or otherwise experiencing the entertainment environment.

The entertainment environment includes environment elements ("elements" for brevity) that are part of the environment and are distinguishable from other environment objects in the environment. For example, where the environment includes a display of a virtual space, objects might include trees, characters, buildings, background, lighting, hot spots (points or locations in the virtual space that trigger or cause some response when approached, touched, etc.), movable objects, groups of elements (e.g., a crowd of people might be an object), hazards and other objects.

Hazards are environment elements that, when interacted with, dictate averse events for the user's character(s). For example, in a racing game, a wall is a hazard and if the user's character's vehicle hits the wall, the character/user loses points. In a fighting game, forcing another character to interact with a hazard might cause that other character to lose health points.

An element is considered interactive if a user action alters the elements behavior, position or other state. For example, a rock element is interactive if the user can move his or her character such that the character "picks up" the rock. Examples of non-interactive elements include background buildings, scenery, etc. The game rules and program code executed by the entertainment system might have rules that allow for elements to switch between being interactive and non-interactive.

The entertainment environment might include music, wherein music can be stored as a digitized audio sequence, a stream of notes or other indicia of music and its timing that the entertainment system can convert to music. The music might be stored with the system, obtained external to the system or the like. The music can have musical features that are found in the music. Examples of musical features include, but are not limited to, particular notes or a particular sequence of notes, a beat or particular beats, a pitch, a phrase or verse, a type or genre of music, lyric, and/or a volume level of the music. The occurrence of a musical feature of interest is referred to as a musical event. A musical event can occur at a single point in time in the music or over a period of time of the music. Thus, a feature of music is that it includes playing out middle C, and the occurrence of that note could be a musical event.

In an entertainment environment provided by an entertainment system, musical events can trigger behavior or response of one or more environment element based on one or more musical event. For example, where the entertainment system is a video game, the game might display buildings that sway to the beat of the music. In another example, touching an object in synchronization with the beat of the music might result in an enhanced response, such as more points than otherwise or more damage than otherwise.

A response of a particular object (i.e., how the system treats the representation of the object according to how the system is programmed) to a musical event can vary according to triggers. In some implementations, for example, musical events are associated with behaviors or responses of elements by associating tags identifying musical events with behaviors or responses of elements. A specific example might be that an object in a game such as a hotspot might be associated with a musical note such that the response when the user touches the hotspot while that musical note is not playing is one score, but the response when the user touches the hotspot while that musical note is playing is another score, such as a higher score. The associations between musical events and elements that a trigger relates so might be flexible in that the triggering can occur slightly before or after the actual musical event and the entertainment system might maintain a set of time tolerances that allow for triggering event without exact synchronization.

For an interactive element, the triggering might alter the interactive element's function or response to user actions. For example a triggered element (i.e., an element that has an association with a musical event and that musical event is currently happening or happened within a tolerance time) might behave one way when picked up (e.g., add to the picking character's strength), and behave another way when it is not triggered (e.g., not changing anything, or lowering the character's strength).

An association is a mapping of one or more musical event to one or more element in the environment. These mappings might be stored as a table of mappings wherein each entry indicates the musical event(s) and the element(s). The mappings might be stored in a data structure associated with musical events, such as a musical events table, or a data structure associated with elements, such as an elements table. A mapping might also include an indication of the function, behavior or response that would be triggered for the element for a given musical event.

Tagging is a process of labeling portions of music to indicate the musical events that occur in those portions of music. Tagging might be done by human music editors, using an editing computer system to generate a musical events table, database, data structure, etc. Alternatively, or as well, an automated tagging program might input the music and output where the musical events are, according to a set of rules about music that the tagging program uses.

Examples of elements include visual elements, such as geometry, shattered geometry, lighting, shadows, shader effects, sky domes and special effects. These elements can be interactive or non-interactive as determined by the coding of the game or system. Each of these might have associations with musical events.

Geometry refers to non-interactive elements that exist in the environment and generally represent objects or things. Examples of such elements include buildings in the background of a scene of a virtual space and garbage dumpsters at a gas station presented in the virtual space. Geometry can be associated with musical events and move to the music or have other triggers.

Shattered geometry refers to geometry elements that have "suffered damage" and are overlaid with shattered texture or other indications of damage. Damage might occur when musical events occur and/or when musical events and user actions occur at or near the same time.

Lighting refers to elements that provide "light" to illuminate other elements in a scene of a virtual space. Shadows can be added into the environment and might be independent of lighting. The lighting and shadows might have associations so that they respond to musical events. For example, a light source might move left to right each time a beat occurs and then move back.

Shader effects include, for example, colors that get changed on surfaces (but that are not lighting), tiles in a subway, and the dimming of a video. These can have associations with musical events.

A sky dome is used to represent the sky in a virtual space, and is often not ordinary geometry as it need not have a Z axis component. Elements of a sky dome, for example, might include clouds, stars, etc. Each of those elements might be associated with musical events and thus, for example, animate and/or move to the musical events.

Special effects include lighting effects, particle effects, and weather systems. These effects can also move in response to the musical events if associated with musical events. Lighting effects deal with lights that are not tied to venue-specific lights. These lighting effects might move to the beat of the music and include neon lights, black lights, strobe lights, light glows, light blooms, lens flares and heat waves. Particle effects portray effects including many small specks. These effects can move to and/or be influenced by musical events. This can depend on how they are used. Such effects include dust, smoke, sparks, blowing debris, fire, explosions, haze, steam and sparkles. Weather system effects include rain, fog and lightning, which can also be brought to the venue and can move and/or be influenced by musical events.

Shattered geometry can moves to the music if that is indicated by its associations. When background elements become shattered, they may move to the music differently than the unshattered geometry that it replaced as a result of the occurrence of the shattering event.

Venue-specific light sources can also move to the musical events, and can include light sources such as lamps, streetlights, etc. as well as sources such as the sun.

Some very specific examples will be described for illustration purposes and it should be understood that the invention is not limited to these examples. In a specific example, the entertainment system is a game console having a processor that executes game code and part of that game code are instructions for accepting user input, determining what to do with the user input, changing a game state based on that user input, and presenting a display and other outputs based on that game state. For example, the user might cause the user's character to push another character into a gas pump and, if the user does so along with the beat of the music, the gas pump might explode, i.e., the musical event is the beat, the music is tagged with the event and the musical event is associated with a response of the gas pump. Environment elements such as buildings can "come alive" to the beat of the music, and game play hazards can be triggered by musical events.

To set up the entertainment environment, musical events are associated with elements and actions. Tools can be used to tie the musical events to the elements and actions through an association process. The tagging process can be used to tag various cues in a music track so that the cues can be associated with various elements and functions, behaviors and/or responses of those elements.

Interactive elements can be triggered by the musical event to function in a desired way. For example, a "hazard" element can be triggered by the beat to add an element of danger to fights in an entertainment environment such as a video game. This hazard element can cause damage to fighters that come in contact with it and can be used tactically against an opponent during a fight. Players will generally try to avoid the hazards, while trying to use them strategically against opponents. Hazard elements, in some embodiments, can be in one of three states: on, off or neutral. The timing and state of a hazard can be functions or responses of the hazard and thus can be associated with musical events. Thus, a hazard can be triggered by cues in the music and can move to cues in the music.

A hazard can belong to different hazard classes. In the context of an interactive game, hazards within a specific class share the same game play mechanic. There are a number of hazards classes whose game play mechanics are re-used throughout the game environment or venue. Thus, associations might associate musical events with a class of hazards and those associations might apply to all hazard elements in the hazard class.

Hazards can be classified by hazard types, for example, each having different behaviors or a progression. With respect to different behaviors, this can include the behavior of repeating constantly with the beat. With respect to progressing, this can include a progression of danger as the music/fight (in a fighting game) continues.

Crowds in the game environment can also act as a hazard. While a crowd's movement can be based on music events (or cues), and such, they are not based on the user's actions, their becoming hostile can be a result of the user's actions in the game environment. For example, the fighters' actions increasing the momentum of a fight such as a boxing match in a game can be reflected as an increase in crowd hostility. A crowd sway rating can also change as a result of fighters' actions.

User actions can be tied to musical events in such a way that a user can trigger an effect on elements of the entertainment experience by way of the user acting in response to a musical event. For example, an "impact" mechanism is triggered when a game player delivers a significant impact (for example, a punch or a hit) to an opponent on a key musical beat. In response, the impact mechanism can provide a visually stunning ripping-tearing-shattering effect to various interactive and background visual elements. For example, in the context of a fighting game, these can be implemented as timed, big hits that cause additional health loss to the fighter on the receiving end of the hit.

A "shattering" element might reflect collateral damage to the elements in a virtual space caused by an attack that is associated with a particular musical element, such as a predetermined tagged beat of the music. For example, in a fighting game, a successful "money" attack (i.e., an "on the money" attack, a highly successful attack) timed to a predetermined musical event such as a music beat causes collateral damage in the venue where the fight is being held. (In the case of electronic games, the venue is part of the game environment. In a fighting game, the venue is the particular location within the game environment where the fight occurs.) A successful money attack might cause a shockwave ripple effect of damage that emanates from the impact and shatters the venue elements within view of the camera. This view of the damage is called the "cone of damage." The camera can be an in-game camera showing the venue from a particular angle. The damage can be represented in the entertainment environment by a "shattered style" which visually takes a venue element and slices it apart so that it appears to be fractured. The collateral damage caused by such an attack can also cause additional Health loss to a fighter on the receiving end of the attack.

Visual elements can provide a visual reference cue for the music by correlating the entertainment environment with the music. This can be used to create effects such as making a venue move to the music. Interactive elements can be actively involved with game play but can also move to the music, for example, when they are not actively involved in game play.

As explained above, associations can be between a musical event and an element, its functions, its behaviors, and/or its responses, and similar associations can be between an element class rather that just an element. The response of an element might vary based on whether it is a held element or a resting element. For example, an object that can be thrown and caught one-handed or two-handed, or objects that can be thrown but not caught, might have one set of responses when they are being held, another set of responses when they are being thrown and another set of responses after they come to rest or are dropped. For example, they may move to the music when they are not held or being thrown.

The visual state of an element can be used to show its status as damaged or destroyed. For example, an element can be implemented so that it continues to move to the music while it is damaged and implemented to stop moving to the music after it is destroyed. The health of the element can be implemented so that its health is not affected by its movements to the music. Thus, the status of an element might affect what its responses are to musical events.

In one specific implementation, structures and collisions attached to them can be implemented so that they do not move to the music except that objects that are attached to structures move to the music and when structures have suffered geometry damage, they move to the music.

Hot spots are usually attached to another interactive element type, for example a structure element or an interactive element. If the element that the hot spot is attached to is moving to the music, then the hot spot might move in conjunction with the element. If the element to which the hot spot is attached is not moving to the music, then the hot spot might move to the music independently of the element. When a hot spot is destroyed, if its geometry remains in the venue, then it can continue to move to the music.

Crowds are examples of visual elements. In a fighting game, when crowds are not being interacted with by a fighter, they can move, bounce, sway, etc. to the music so as to provide visual cues to the music. Such movements are part of the non-interactive crowd reactions. When a crowd's characteristics are supportive of a particular player character, the crowd can be implemented so as to show their support in various ways. The crowd can clap to the beat of the music. This can be implemented without the sound effects of clapping in order to provide a purely visual element. The crowd can cheer through various gestures such as a "raise the roof" gesture, in which a person raises his hands above his head in such a way as to indicate that he is pushing something up over his head. This "raise the roof" gesture can be timed to coincide with the desired musical elements (for example, the beat). The crowd can initiate this gesture after successful attacks and/or combos (combinations of movements) of their supported player character. This can be implemented so as to cause the loss of some number of health points worth of damage to the opponent.

The crowd can also cheer by swaying to the music. The sway of the crowd can indicate whether the crowd is cheering for the player or the opponent. A crowd can indicate that it is hostile to an opponent through other crowd characteristics such as pumping their fists in the air to the beat of the music. A crowd characteristic such as head nodding can indicate that the crowd is neutral to the player.

FIG. 1 is a block diagram of a game device 14 in accordance with an embodiment of the present invention. It should be understood that other variations of game device 14 may be substituted for the examples explicitly presented herein. As shown, game device 14 includes a processing unit 20 that interacts with other components of game device 14 and also interacts with external components to game device 14. A game media reader 22 is included that communicates with game media 12. Game media reader 22 may be a CDROM or DVD unit that reads a CDROM, DVD, or any other reader that can receive and read data from game media 12.

Game device 14 also includes various components for enabling input/output, such as an I/O 32, a user I/O 36, a display I/O 38, and a network I/O 40. I/O 32 interacts with a storage 24 and, through a device 28, removable storage media 26 in order to provide storage for game device 14. Processing unit 20 communicates through I/O 32 to store data, such as game state data and any shared data files. In addition to storage 24 and removable storage media 26, game device 14 includes random access memory (RAM) 34. RAM 34 may be used for data that is accessed frequently, such as when a game is being played.

User I/O 36 is used to send and receive commands between processing unit 20 and user devices, such as game controllers. Display I/O 38 provides input/output functions that are used to display images from the game being played. Network I/O 40 is used for input/output functions for a network. Network I/O 40 may be used if a game is being played on-line or being accessed on-line.

Game device 14 also includes other features that may be used with a game, such as a clock 42, flash memory 44, read-only memory (ROM) 46, and other components. An audio/video player 48 is also used to play a video sequence such as a movie. It should be understood that other components may be provided in game device 14 and that a person skilled in the art will appreciate other variations of game device 14.

Figure 2:
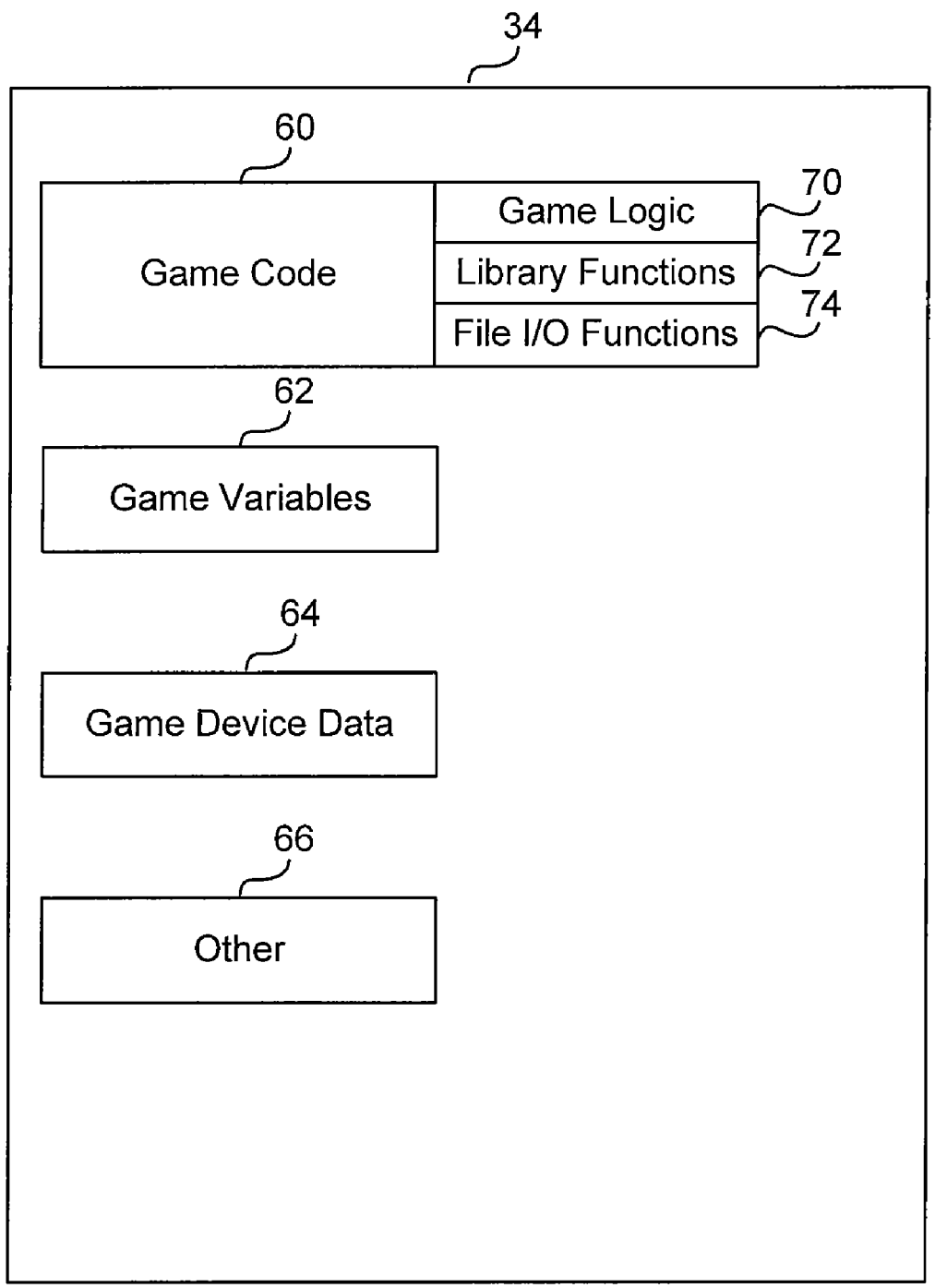
FIG. 2 is a block diagram of a memory storage of a game device in accordance with an embodiment of the present invention.

FIG. 2 illustrates an example of game variable memory as might be used in the entertainment device shown in FIG. 1. The memory might comprise data that may be stored in RAM 34 to provide a game according to one embodiment of the present invention. For example, a game code 60, game variables 62, game device data 64, and other data 66 may be downloaded from game media 12 and stored in RAM 34. It will be understood that a person of skill in the art will appreciate other data that may be stored in RAM 34 that will enable game device 14 to provide the game. In addition to games, other entertainment environments might be supported.

Game code 60 may be any logic that is found on game media 12 that is used to provide a game, such as program code comprising a plurality of computer instructions. As shown, game code 60 includes game logic 70, library functions 72, and file I/O functions 74. Game logic 70 is used to provide any functions of the game. Library functions 72 include any functions that are used to support the game. File I/O functions 74 are used by processing unit 20 to perform input/output functions.

Game variables 62 are variables that are specific to a game and are used by processing unit 20 to provide variations of games for different users. The variables allow game device 14 to provide variations to the game based on actions by a user playing the game.

Game device data 64 is data specific to a game hardware that game code 60 is designed for. For example, different versions of game code 60 may be designed for different platforms supported by different game devices 14. Data specifically needed to operate game code 60 on a specific platform for a specific game device 14 may be included in game device data 64. Other data 66 may be any other data that is used with the game.

As a game found on game media 12 is played on game device 14, data regarding the state of the game and any other related aspect of the game may be generated. The game state data is then stored in storage, such as storage 24, removable storage media 26, RAM 34, or any other storage media accessible to game device 14. The game state data may then be used at another time by game device 14 to provide a game that is in the same state as when a user last played the game and saved its state. For example, the game state data may include data that allows a user to continue at a same level that the user has completed, data related to certain achievements that the user has accomplished, etc. It should be noted that the game state data does not necessarily start the game at the same exact place as the place when the game was last stopped but rather may start the game at a certain level or time related to when the game was last stopped or its state was saved.

Game variables might include, for example, view variables, character variables, selection variables, etc. View variables might include, for example, a view point, a view direction (or angle), a view rotation (or orientation), a view extent, cursor location(s), etc. Character variables might include, for example, an array of values for each character active in the game, state data on each character (e.g., name, health level, strength, possessions, alliances, type of character, etc.). Selection variables might include, for example, an array of selected elements. Game variables may include sets of associations and tag sequences, or these might be fixed in the game code.

Figure 3:
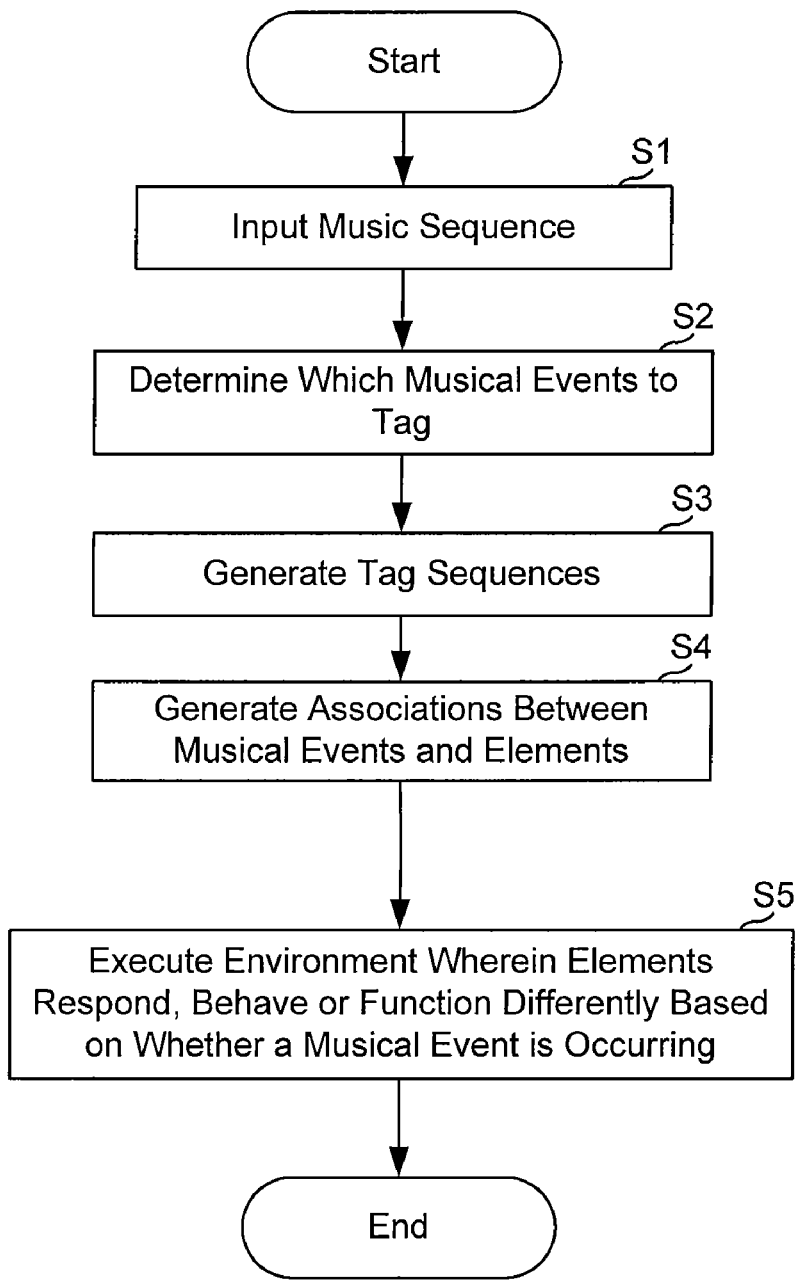
FIG. 3 is a flowchart illustrating a process for creating an entertainment environment in accordance with an embodiment of the present invention, including generating and using musical event associations.

FIG. 3 is a flowchart illustrating a process for creating an entertainment environment in accordance with an embodiment of the present invention, including generating and using musical event associations. In the flowcharts, the steps are labelled S1, S2, etc., but are not restricted to being performed in that order unless otherwise indicated. In the example process shown there, it might be executed by a game system such as a game console programmed to implement a video game.

The system inputs a music sequence in step S1, and then determines which musical events to tag (S2). For example, the system might only tag music beats. Once the set of events to tag is determined, the system generates a tag sequence that corresponds to the music sequence (S3) and generates associations between musical events and elements (S4) as described herein. The system can then execute the environment wherein elements respond, behave and/or function differently based on whether a musical event is occurring (S5). In other embodiments, the tag sequence might be generated on the fly as the music plays.

Figure 4:
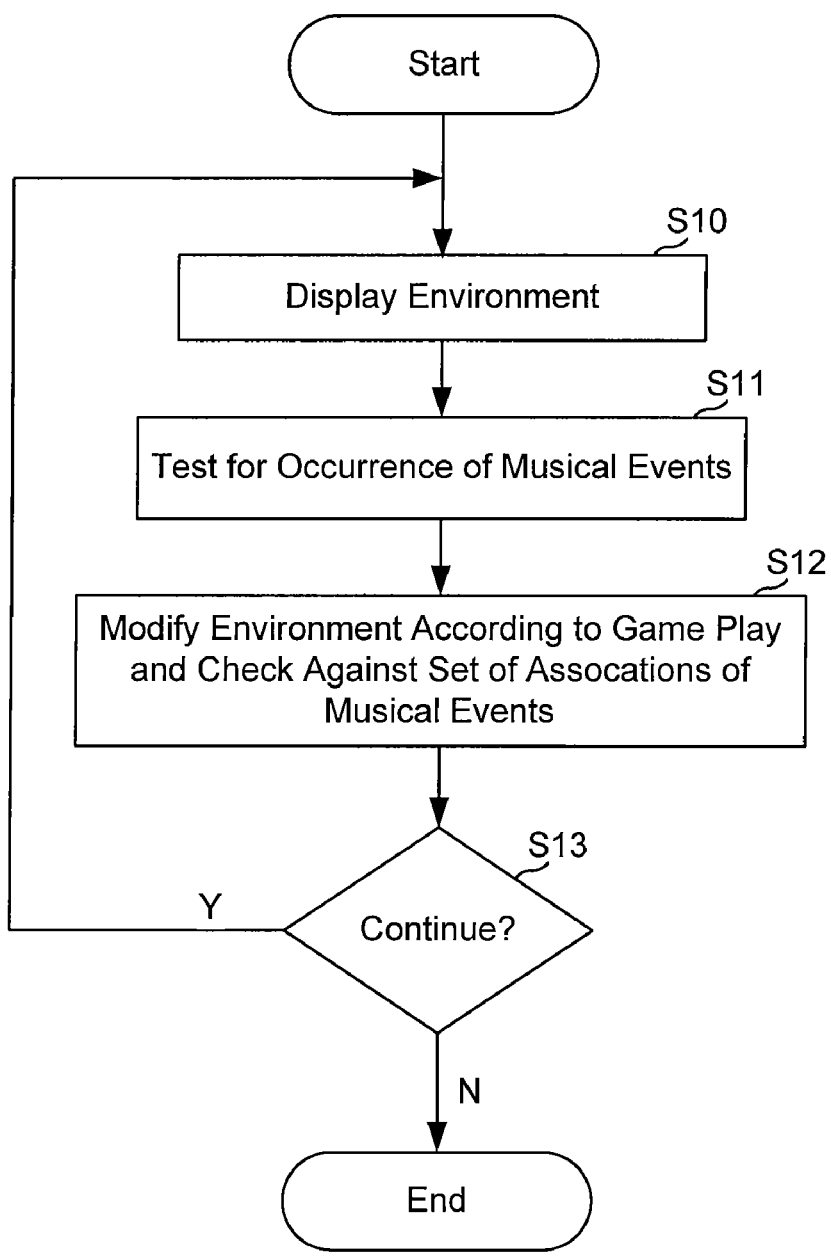
FIG. 4 is a flowchart illustrating a process for operating an entertainment environment in accordance with an embodiment of the present invention.

FIG. 4 is a flowchart illustrating a process for operating an entertainment environment in accordance with an embodiment of the present invention. In this example, a system might display an entertainment environment (S10), test for the occurrence of musical events (S11), and then modify the environment according to game play while checking against a set of associations and the occurrence of certain musical events (S12). A loop continues (S13) until finished, looping back to update the displayed environment and so on.

Figure 5:
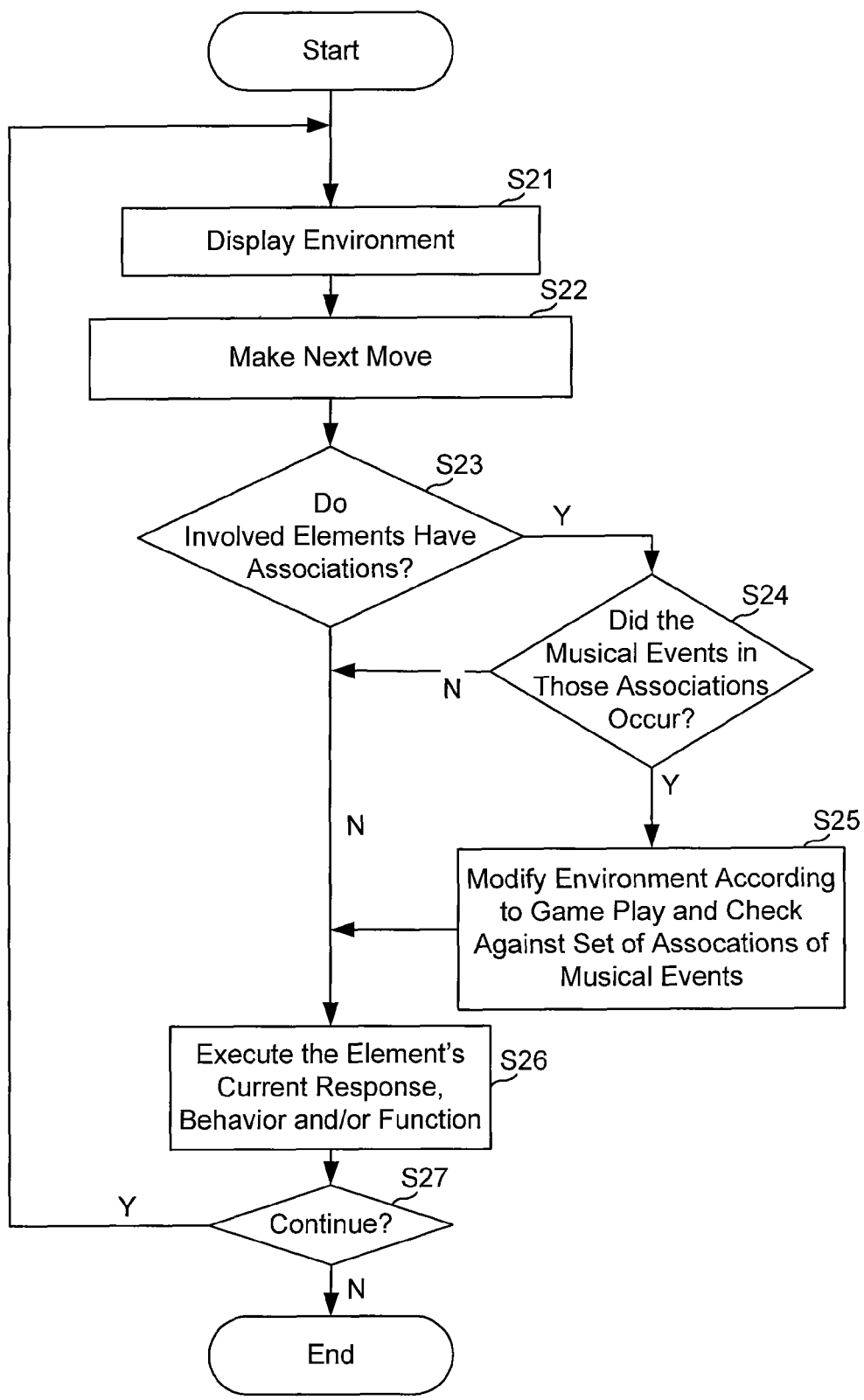
FIG. 5 is a flowchart illustrating an alternative process for operating an entertainment environment in accordance with an embodiment of the present invention.

FIG. 5 is a flowchart illustrating an alternative process for operating an entertainment environment in accordance with an embodiment of the present invention. In that example, an environment is displayed (S21) and the system makes a next move (S22), such as advancing a character through a movement. The system can then check, at that time, whether elements involved in that movement (or possibly a change in state) have associations (S23). If so, then those associations are checked and it is determined whether the musical events that are part of those associations are occurring or have occurred (S24). If they are, then the associated element's response, behavior or function is modified, or data is changed such that further processing will cause such modification (S25).

If there are no involved elements that have associations at step S23, or their associated musical events did not occur at step S24 or after step S25, the process continues with step S26, wherein the system executes the element's currently set response, implements the element's currently set behavior, and/or processes the elements currently set function. If the process continues (S27), it might loop back to step S21 for another display of the environment.

Various examples have now been described of entertainment environments that include elements that are associated with musical events. The elements that are associated with musical events need not have anything to do with music, but could. For example, an electric guitar element might jump up to the beat of music, but a sword might also jump up to the beat of the music if it is lying on the ground or otherwise not being used.

The particular music might be independent of the game being played, such that the same game can be played with different music sequences, resulting in different game play scenarios. For example, if the musical event that is associated with a bomb being activated when a user's character approaches is a musical event of a loud bass note, the game becomes much more dangerous if the user selects a music sequence to use with the game that has frequent loud bass notes but is easier to play if softer music is selected. In this manner, one game can be programmed, but many different game play experiences had, just by changing the music played during game play.

Of course, there is an element of strategy introduced, as users who know that there are different responses, functions or behaviors can decide when to use or interact with an element to their best advantage and can get timing information from the music stream or visually from elements that are moving to the music. Thus, if the brushes of a carwash are moving to the rhythm or beat of the music, the user might time a run through the carwash based on what musical events are coming up. Visual cues might be provided as a sort of virtual metronome.

Some variations might have lighting effects moving to the beat of the music and in some cases, particular music might be associated with particular levels of game play such that each song is tied to a particular level and the level environment changes when the song changes.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method for creating an entertainment environment for implementation within an electronic entertainment system, the method comprising:
    electronically processing music to form a storable music sequence;
    determining a set of musical events of interest;
    tagging the music to form a sequence of musical events selected from the set of musical events of interest and associated with portions of the storable music sequence; and
    generating a set of associations, wherein an association is represented by a data structure and indicates a mapping between at least one musical event and at least one element of the entertainment environment, and said at least one element of the entertainment environment being triggered by and enhanced by said at least one musical event when said at least one musical event is synchronized with said at least one element.

2. The method of claim 1, wherein the association between a musical event and an element specifies which of the element's responses, behaviors and functions are associated with that musical event.

3. The method of claim 1, wherein the association between a musical event and an element specifies a response that the element will express if and when the musical event occurs.

4. The method of claim 1, wherein the storable music sequence is a digitized audio sequence.

5. The method of claim 1, wherein the storable music sequence is a stream of notes or other indicia of music and its timing that the electronic entertainment system can convert to music.

6. The method of claim 1, wherein the musical events comprise one or more of particular notes, particular sequences of notes, beats, pitches, phrases, verses, a type of music, a genre of music, and a volume level of music.

7. A method of operating an electronic entertainment system that provides an entertainment environment, the method comprising:

reading in a musical sequence;

determining when a predetermined musical event occurs in the musical sequence;

reading in a set of associations, wherein an association maps a musical event and an element of the environment; and triggering and enhancing the element by synchronous performance of the musical event.

8. An apparatus for creating an entertainment environment for implementation within an electronic entertainment system, comprising:

an input for receiving a music sequence in electronic form;

program code for determining a set of musical events of interest;

storage for a tag sequence, wherein tags of the music indicate which of a selected set of musical events of interest occur in the music sequence; and logic for generating a set of associations, wherein an association is represented by a data structure and indicates a mapping between at least one musical event and at least one element of the entertainment environment, wherein the at least one element is triggered by and enhanced by synchronous performance of the at least one musical event.

* * * * *